July 17, 1962 E. B. JAMES 3,044,620
SORTING AND UNLOADING APPARATUS FOR DRAWBENCHES AND THE LIKE
Filed Dec. 1, 1958 5 Sheets-Sheet 1
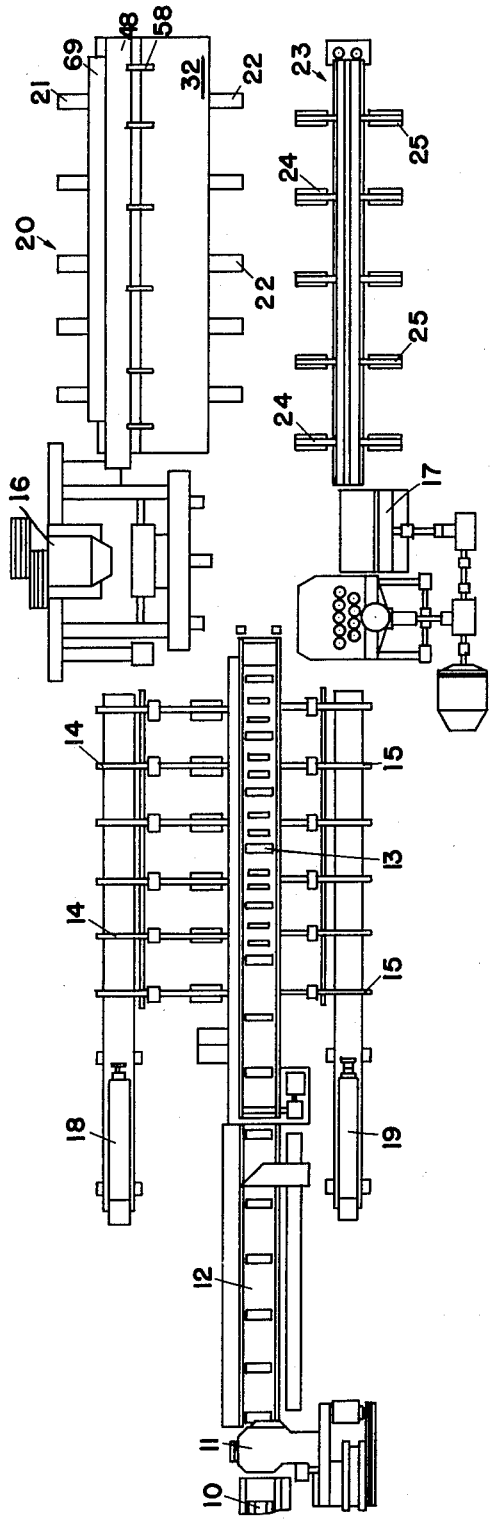
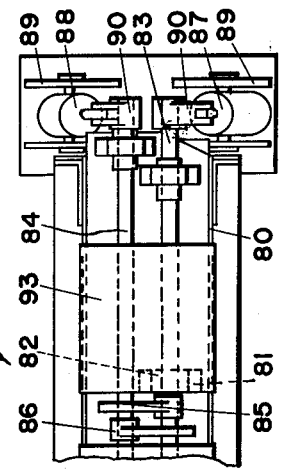
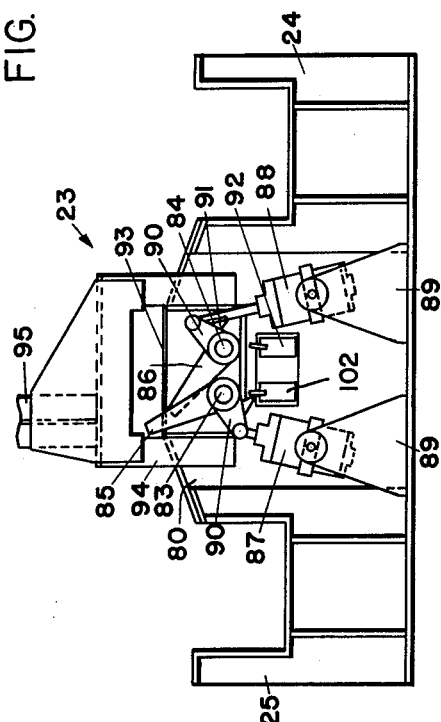
INVENTOR
EDWIN B. JAMES
BY Francis J. Klempay
ATTORNEY

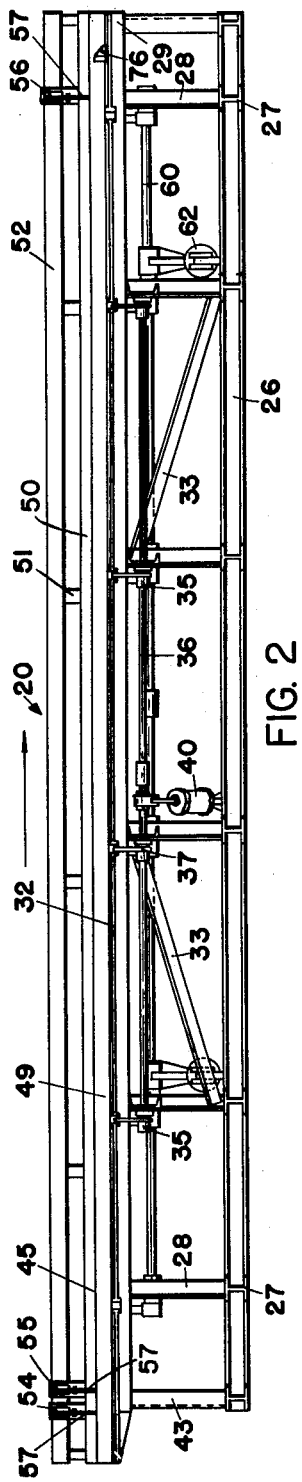
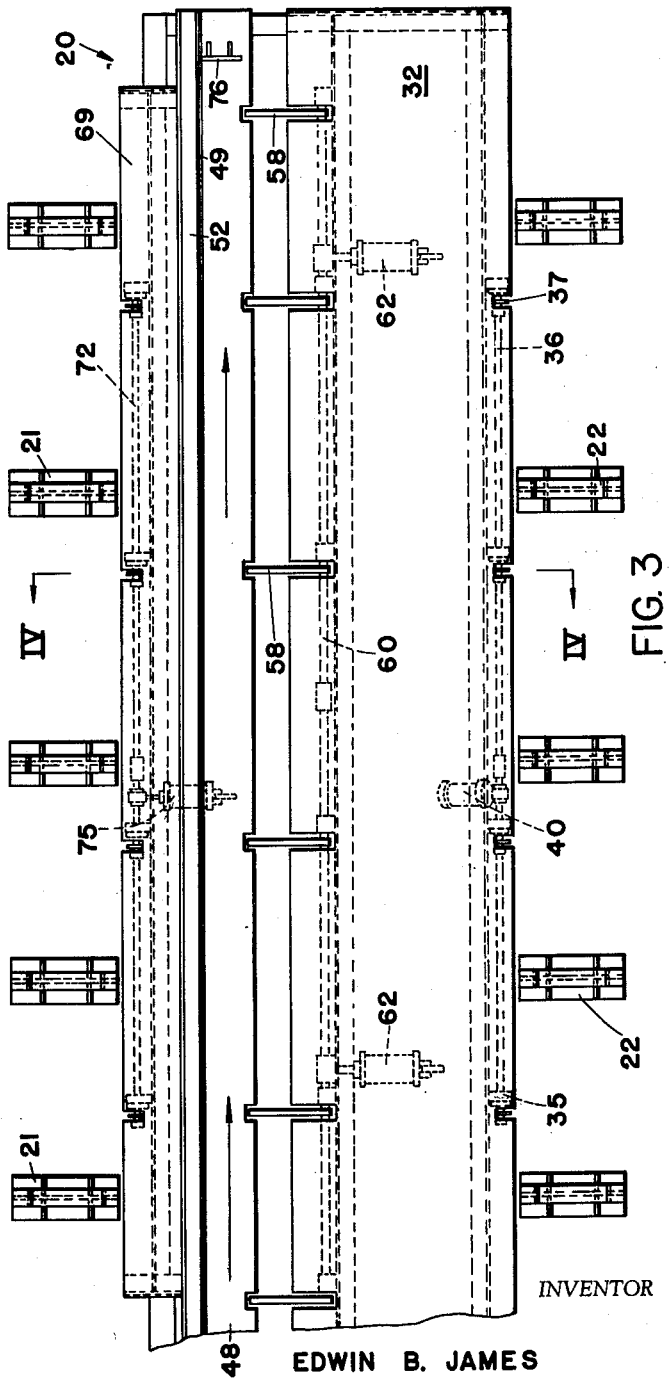

July 17, 1962 E. B. JAMES 3,044,620
SORTING AND UNLOADING APPARATUS FOR DRAWBENCHES AND THE LIKE
Filed Dec. 1, 1958 5 Sheets-Sheet 3

INVENTOR
EDWIN B. JAMES
BY Francis J. Klempay
ATTORNEY

July 17, 1962  E. B. JAMES  3,044,620
SORTING AND UNLOADING APPARATUS FOR DRAWBENCHES AND THE LIKE
Filed Dec. 1, 1958  5 Sheets-Sheet 4
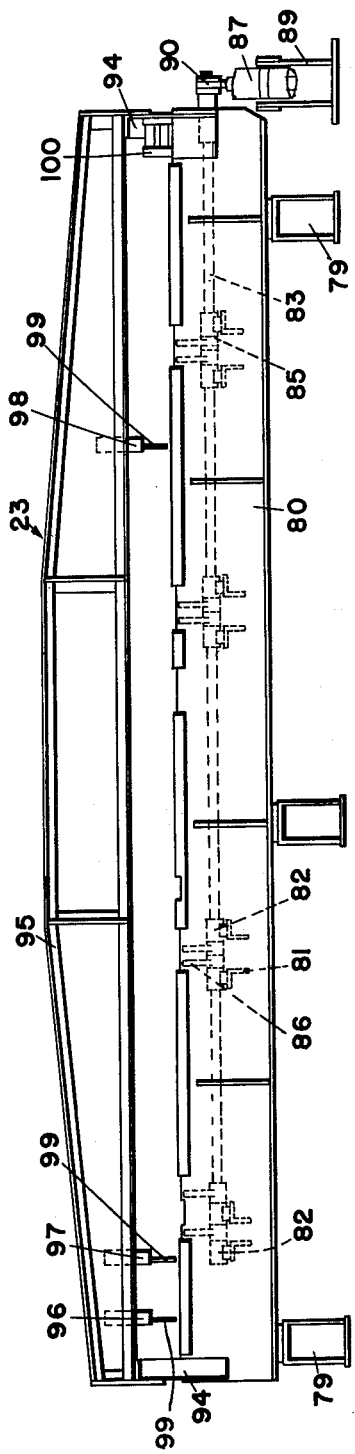
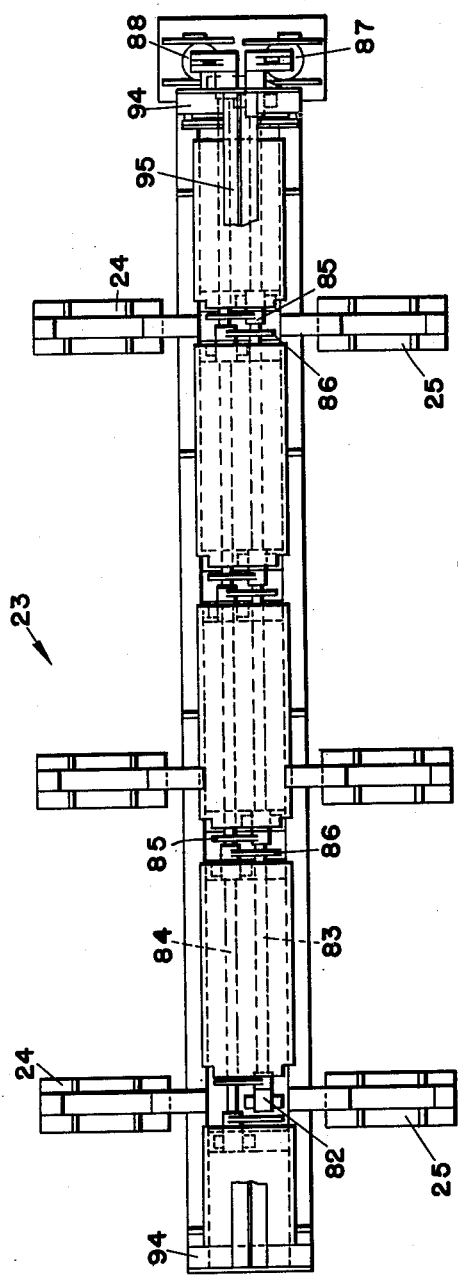
INVENTOR
EDWIN B. JAMES
BY *Francis J. Klempay*
ATTORNEY July 17, 1962   E. B. JAMES   3,044,620
SORTING AND UNLOADING APPARATUS FOR DRAWBENCHES AND THE LIKE
Filed Dec. 1, 1958   5 Sheets-Sheet 5

INVENTOR
EDWIN B. JAMES

BY *Francis J. Klempay*

ATTORNEY

United States Patent Office 3,044,620
Patented July 17, 1962

3,044,620
SORTING AND UNLOADING APPARATUS FOR DRAWBENCHES AND THE LIKE
Edwin B. James, Youngstown, Ohio, assignor to The McKay Machine Company, Youngstown, Ohio, a corporation of Ohio
Filed Dec. 1, 1958, Ser. No. 777,372
1 Claim. (Cl. 209—82)

The present invention relates generally to apparatus for handling elongated lengths of metal stock in an automatic and expedient manner and more particularly to sorting and unloading apparatus for drawbenches and other like mechanisms. Although the illustrated embodiment of the present invention is specifically designed for and will be described for use in connection with a drawbench, it should be understood at the outset that the teachings and apparatus of the present invention are equally applicable to and adapted for use with other like mechanisms, such as extrusion presses and continuous tube mills, for example, as will be understood by those skilled in the art upon further consideration of the specification.

In accordance with well known prior art practice, a drawbench is provided for reducing or forming the cross sectional area of elongated metal sections. It is common practice to provide a stationary die block mounting a plurality of removable dies and an elongated frame or track extending in the direction of the draw from the leaving side of the dies. A carriage is mounted on the frame or track for longitudinal movement therealong and carries gripping means for engaging and holding the reduced or pre-pointed end portions of the metal sections which are initially loaded to project through the dies. The carriage, or draw buggy as it is commonly referred to in the art, is adapted to grip the projecting ends of the metal sections and then is moved outwardly along the frame or track by means of a hook mounted on the draw buggy engaging a link of a continuously driven chain thereby drawing the metal sections through the dies to form and/or shape the same. Such mechanism may also include means for removing the metal sections or stock from the draw buggy, means for returning the draw buggy to its initial starting position adjacent the die block, automatic handling equipment for loading the pre-pointed metal sections into the die block, and suitable control apparatus for effecting generally continuous and automatic operation of the drawbench. The general arrangement and operation of such drawing mechanism is shown and described in the prior patents to Kerr and Andrews et al., Nos. 2,404,234 and 2,331,953, respectively, which are representative of prior practice in the art and are made of record for those desiring a more detailed description of the same.

In drawing mechanism of the above character the problem has arisen as to how to handle the drawn metal sections to provide sorted length classifications thereof in an automatic manner for both round and shaped metal sections. Inasmuch as the drawbench is a continuously operating machine, means must be provided for efficiently and expeditiously handling the drawn metal sections without interfering with the smooth operation of the drawbench and to enable the drawn metal sections to be taken care of without the necessity of manual handling thereof.

The usual drawbench is adapted to draw metal sections of considerable length, forty feet, for example, and to realize maximum utilization of the drawbench metal sections of a length corresponding to the maximum length capacity of the drawbench are always drawn even when the desired final product is of substantially less length. To provide shorter lengths of drawn metal sections a metal saw is positioned adjacent the discharge end of the drawbench. Many of the sections cut from the elongated metal sections are not the same length because of stock wastage due to the pre-pointed end portions of the elongated metal sections, the dimension of the shorter length required, etc. For example, if pieces of twelve foot length are desired from a drawbench with a capacity of forty foot lengths, the saw may be operated to cut an elongated metal section into two twelve foot lengths and one piece of sixteen foot length. In some instances, of course, the non-uniform piece will be of a shorter length than the length of the desired pieces cut from an elongated drawn metal section. Thus, the problem of sorting or classifying the severed pieces into two length classifications—one being the pieces of desired length within certain tolerances and the other being the pieces which are too long or too short as the case may be—arises.

In order to provide the desired final product of the drawbench it is usually necessary to incorporate straightening means for straightening the cut pieces as the elongated metal sections are warped to a certain extent during normal drawing operations. Such straightening means may comprise a plurality of power driven rolls, for example. A drawbench is adapted to form and/or shape elongated metal sections of round or shaped cross section and it is therefore necessary to provide two straightening means—one for the cut round pieces and one for the cut shaped pieces—and consequently the problem arises of providing apparatus for sorting and classifying the drawn, cut and straightened metal pieces into two length classifications for both the round and shaped pieces. A further problem is evidenced in connection with the round pieces as these pieces are ejected from the round straightening means in a gyrating and whipsawing manner and means must be provided for supporting and restraining the round pieces as they issue from the straightening means.

It is therefore the primary or ultimate object of the present invention to provide sorting and unloading apparatus for drawbenches and the like which is characterized by its ability to satisfy all of the above requirements.

It is another object of the present invention to provide improved sorting and unloading apparatus for drawbenches and other like mechanism which is adapted to classify elongated pieces of metal stock into two classifications depending on the length thereof in a fast and efficient manner.

A further object of the invention is to provide apparatus of the character described adapted to supoprt, classify and unload pieces of metal stock in a highly efficient manner without interfering with the operation of the drawbench and auxiliary apparatus therefor in any manner. In accordance with this object of the invention it is thus possible to fully utilize the inherent capabilities of the drawbench.

Another object of the invention is to provide unloading and sorting apparatus for drawbenches and the like which is specifically adapted for handling elongated pieces of metal stock of shapes other than round.

A further object of the invention is to provide unloading and sorting apparatus for the purposes above set forth which is designed for handling round elongated workpieces of metal stock to support, classify and unload the same.

It is yet a further object of the invention to provide unloading and supporting apparatus for round pieces of metal stock issuing from straightening means which comprises means for supporting and restraining the round pieces as they are ejected from the straightening means in a gyrating and whipsawing manner.

A more specific object of the invention is to provide apparatus of the type and for the purposes above described which is characterized by its extreme simplicity in manufacture and assembly but yet is well adapted for heavy duty mill-type operation.

The above, as well as other objects and advantages of the present invention, will become more readily apparent upon consideration of the following specification and accompanying drawing wherein there is disclosed a preferred illustrated embodiment of the invention.

In the drawing:

FIGURE 1 is a plan view of a plant layout of handling equipment for elongated metal sections received from a drawbench or the like, including improved loading and unloading apparatus constructed in accordance with the teachings of the present invention;

FIGURE 2 is a side longitudinal view of the sorting and unloading apparatus for round pieces of metal stock employed in the arrangement shown in FIGURE 1 of the drawing;

FIGURE 3 is a plan view of the sorting and unloading apparatus for round pieces of metal stock;

FIGURE 5 is a side longitudinal view of the sorting and unloading apparatus for shaped pieces of metal stock employed in the plant layout shown in FIGURE 1 of the drawing;

FIGURE 6 is a plan view of the apparatus depicted in FIGURE 5;

FIGURE 7 is an enlarged end view of the sorting and unloading apparatus for shaped pieces of metal stock;

FIGURE 8 is an enlarged fragmentary plan view of one end of the sorting and unloading apparatus for shaped pieces of metal stock showing specifically the actuating means thereof;

Figure 4:
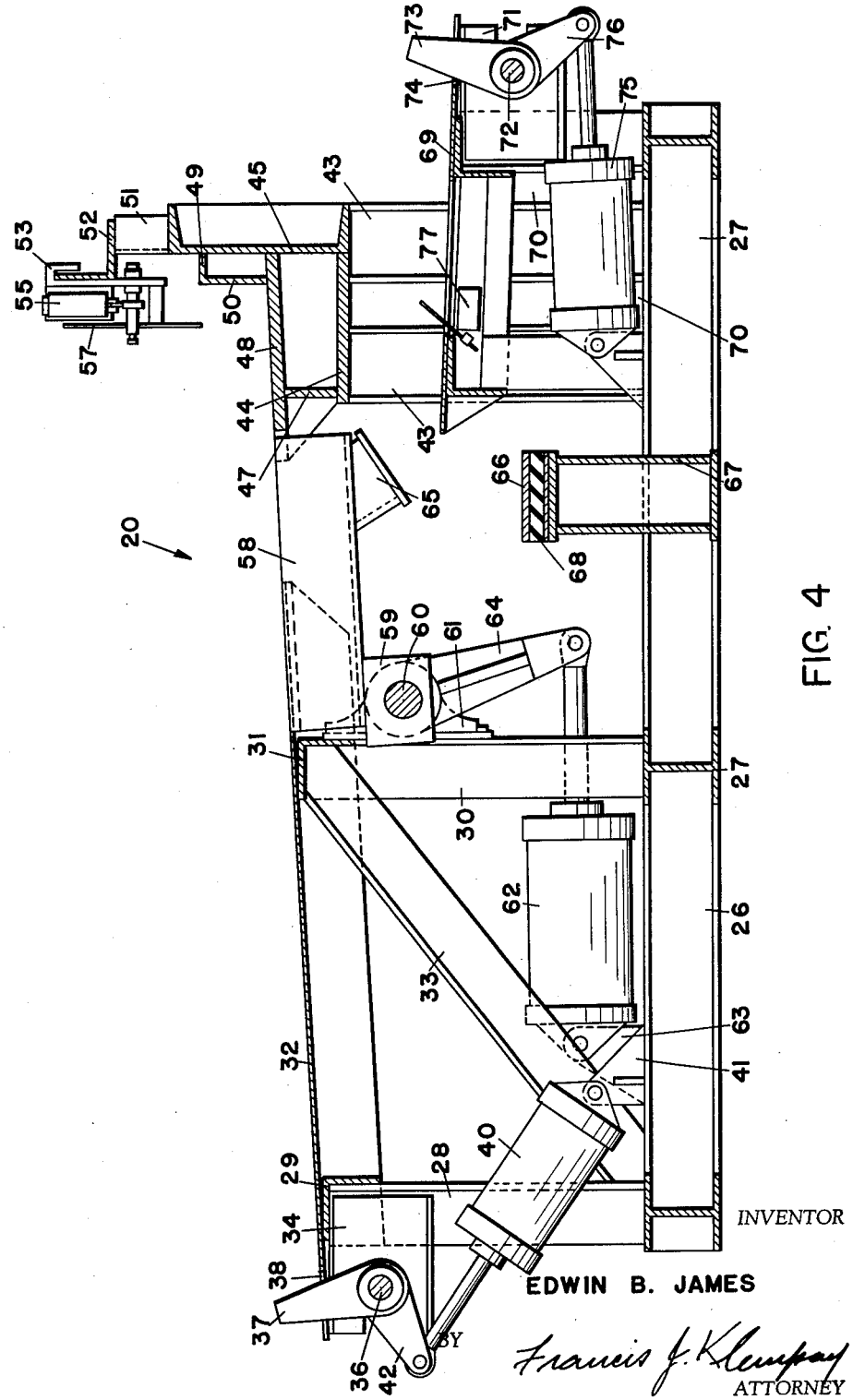
FIGURE 4 is an enlarged end sectional view of the sorting and unloading apparatus for round pieces of metal stock taken along the section line IV—IV of FIGURE 3.
Figure 10:
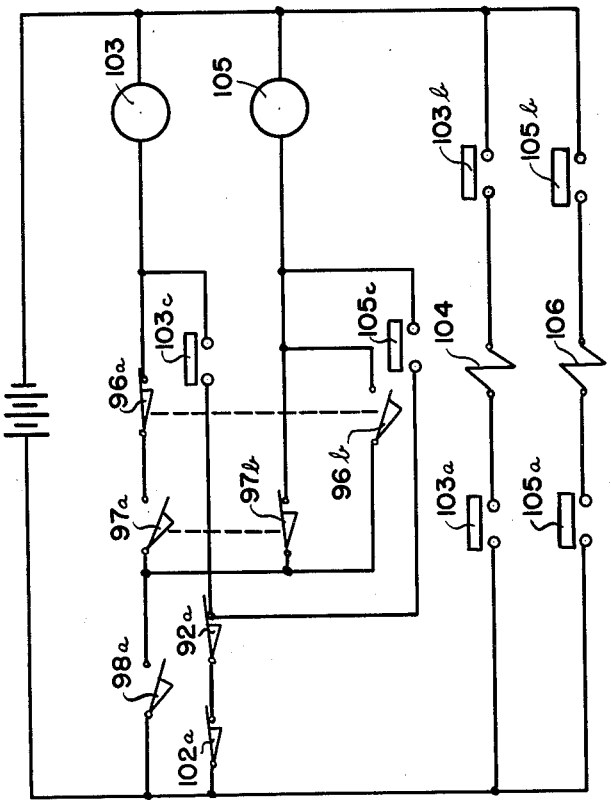
FIGURE 10 is a schematic of the electrical control circuit employed in connection with the sorting and unloading apparatus for shaped pieces.
Figure 9:
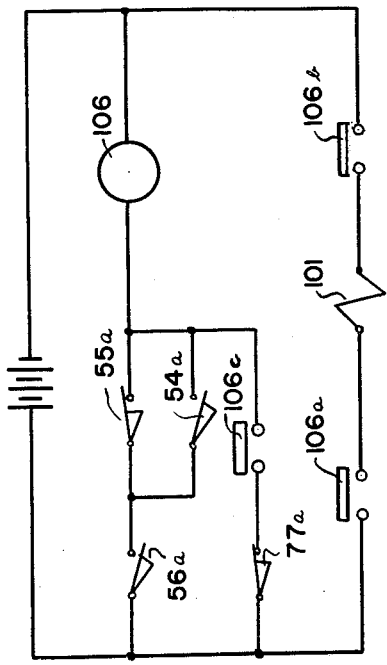
FIGURE 9 is a schematic of the electrical control circuit employed in connection with the sorting and unloading apparatus for round pieces.

Referring now to the drawing, and initially to FIGURE 1 thereof, there is shown in plan a plant layout of handling equipment for receiving elongated drawn metal sections from a drawbench or the like. Such handling equipment comprises a conveyor 10 for delivering the properly formed and/or shaped elongated metal sections from a drawbench, not shown. Positioned at the end of the conveyor 10 is a shear 11 whose function it is to shear the elongated metal sections delivered by the conveyor 10 from the drawbench into shorter lengths in accordance with the desired length of the final product. As explained above, in most cases some of the sheared pieces will be of greater or shorter length than the desired length dimension due to the fact that the drawbench is operated to form and/or shape metal sections of a length corresponding to the maximum length capacity thereof. Also contributing to the variance in length of some of the pieces from the desired length is the wastage provided by the pre-pointed ends of the elongated metal sections and the variations in lengths of the elongated metal sections used in the drawbench.

The sheared pieces are transferred by a suitable conveyor 12 to a kickout device 13 whose function it is to direct the pieces laterally onto the downwardly inclined skids 14 or 15 which are positioned on opposite sides of the kickout device 13. The drawbench is adapted to form and/or shape pieces of any regular cross section and, as will be understood by those skilled in the art, the elongated metal sections may be warped or twisted during the drawing operation and it is necessary to provide straightening means for removing this set from the severed pieces. Since the drawbench is adapted to form and/or shape elongated metal sections of round and other regular polygonal cross section, individual straightening means must be provided for the round pieces and for the shaped pieces. This is accomplished in the present invention by providing a round straightener 16 and a separate shape straightener 17. Both of the straighteners may comprise a series of power driven straightening rolls or any other convenient straightener means.

The kickout device 13 is provided for the purpose of directing the round pieces to the round straightener 16 and the shaped pieces to the shape straightener 17. This device may comprise a plurality of arms for deflecting the round pieces laterally onto the inclined skids 14 positioned on one side thereof and for deflecting the shaped pieces onto the inclined skids 15 positioned on the opposite side of the kickout device 13. The round pieces are adapted to be transferred from the skids 14 to the round straightener 16 by any convenient means, such as pusher mechanism 18, for example, and a comparable pusher mechanism 19 is provided for moving the shaped pieces endwise from the skids 15 to the shape straightener 17. Thus, it will be seen that the drawn elongated metal sections are severed into shorter lengths by the shear 11 and these pieces are then moved to either the round straightener 16 or the shape straightener 17 depending, of course, on whether the individual pieces are of round or other shaped cross section. The shear 11, kickout device 13, inclined skids 14 and 15, round straightener 16, shape straightener 17 and the various transfer mechanisms are arranged in a highly advantageous manner for the purposes indicated but these components, per se, do not form a part of the present invention and may be of any well known construction.

Positioned in front of the round straightener 16 is a sorting and unloading table, generally designated by the reference numeral 20, whose function it is, as will be hereinafter more fully explained, to guide and support the gyrating and whipsawing round pieces as they issue from round straightener in one-at-a-time relation, gauge each of the round pieces to determine whether or not the same have length dimensions within preset and preselected tolerances and direct each of the round pieces to either of the plurality of storage cradles 21 or 22 positioned on opposite sides thereof. If a round piece has an acceptable length dimension—being within preset tolerances—this piece is directed to the storage cradles 22. However, if a round piece is of appreciably shorter or longer length than the desired length it is directed to the storage cradles 21.

Positioned in front of the shape straightener 17 is a shape sorting and unloading table 23 which is adapted to support the shaped pieces as they issue from the shape straightener in one-at-a-time relation and direct the same to either the plurality of storage cradles 24 or 25 positioned on opposite sides thereof. If a shaped piece has an acceptable length dimension it is directed by the shape sorting and unloading table 23 to the cradles 25 while a shaped piece of unacceptable length is directed to the cradles 24. The shape sorting and unloading table 23 also performs the function of gauging the length dimension of the individual shaped pieces to determine whether or not the same fall within preset tolerances whereby they may be properly classified. The construction and the complete operation of the round and shape sorting and unloading tables 20 and 23 will be hereinafter more fully described and explained in the specification. However, it will be noted that both the sorting and unloading tables 20 and 23 perform primarily the same functions although each is designed to handle a particular shape of piece cut from the properly drawn elongated lengths of metal sections.

Considering first the operation and construction of the round sorting and unloading table 20, reference should be had to FIGURES 2–4 of the drawing wherein there is depicted a preferred embodiment thereof. The round sorting and unloading table comprises a large rectangular grid-like base 26 fabricated from a plurality of I-beams 27 or other like structural members. Mounted along one longitudinally extending side of the base 26 are a plurality of longitudinally spaced angles 28 defining a row of vertically extending supports which are spanned at their top ends by an elongated and longitudinally extending angle 29. Positioned intermediate the side edges of the base 26 is a second row of longitudinally spaced and vertically extending angle-shaped supports 30 which are in turn capped and spanned by an elongated and longitudinally extending angle 31. The transversely spaced rows of the plurality of supports 28 and 30 provide supporting means for a large rectangular outer table portion 32 defined by metal sheets or plates attached to the longitudinally extending angles 29 and 31. The vertical supports 30 are of a slightly greater vertical height than the vertical supports 28 whereby the outer table portion 32 slopes gently downwardly from the supports 30 to the supports 28 as is clearly shown in FIGURE 4 of the drawing. The outer table portion is further supported by a plurality of longitudinally and transversely extending angled braces 33 positioned between pairs of the vertical supports. It will be noted that the above detailed construction is characterized by its extreme simplicity but yet provides a very rigid structure well adapted to support and guide elongated round pieces cut from the properly drawn metal sections.

Attached by welding or other convenient means to each of the plurality of angled supports 28, with the exception of the two outermost of these supports, adjacent the top edges thereof is a channel-shaped bracket 34 which projects outwardly from the base 26. The brackets 34 are apertured and mount adjacent their outer ends journal assemblies 35 which rotatably support an elongated longitudinally extending shaft 36. Keyed to the shaft 36 at longitudinally spaced points adjacent the vertical supports 28 are a plurality of stop arms 37 which, at certain times, are adapted to project upwardly through slots 38 provided adjacent the outer edge of the outer table portion 32 above the surface thereof. The shaft 36 is rotated at predetermined times by a stop arm fluid cylinder 40 whose cylinder is pivotally mounted on the base 26 by a mounting clevis 41 and whose piston rod is connected to an operating link 42 attached to the shaft 36. Thus, upon proper actuation of the stop arm fluid cylinder 40 the stop arms 37 are rotated to the position shown in FIGURE 3 of the drawing and provide stop or barrier means whereby round pieces are prohibited from rolling off the outer table portion 32 into the plurality of storage cradles 22. However, upon reverse actuation of the stop arm fluid cylinder 40 the stop arms are rotated in a counterclockwise direction to a retracted position below the plane of the surface of the outer table portion 32 whereby round pieces thereon can roll into the storage cradles 22 as is readily apparent.

Mounted on each end of the base 26 adjacent the other side edge thereof are a pair of transversely spaced channel shaped vertically extending members 43 which form vertical supports for a longitudinally extending plate 44 and a housing member 45. The housing member 45 is an elongated longitudinally extending outwardly facing U-shaped member spanning the rear ones of the pairs vertically extending members 43. Attached to the inner end of the plate 44 is a vertical support 47 which, in combination with the forward face of the housing member 45, serves as a means for supporting an elongated rectangular plate 48 that forms the inner table portions of the round piece sorting and unloading table. It will be noted that the inner table portion slopes gently downwardly toward and in the same plane as the outer table portion 32.

An angle-like member 49 is attached to and in the meeting corner of the forward face of the housing member and the inner housing portion 48 and has a vertical longitudinal guiding surface 50 to prevent undue transverse movement of a round piece as the same issues from the round straightener 16. As mentioned previously, the round pieces come out of the round strightener in a gyrating and whipsawing manner and the round sorting and unloading table is so positioned with respect to the round straightener that the round pieces move along the table adjacent the longitudinal guiding surface 50. As the round pieces come from the round straightener they will be rotating in one direction or the other about their axes and the round sorting and unloading table is so positioned with respect to the direction of rotation of the round pieces that the same are always turning into the longitudinal guiding surface 50 as the same along the inner table portion 48. This is particularly important in the accomplishment of the objects of the present invention in that each of the round pieces is guided and supported in an improved and highly simplified manner whereby the same is limited and restrained to a preselected path of travel as it moves outwardly along the round sorting and unloading table.

Mounted from the top of the housing member 49 by a plurality of longitudinally spaced vertical supports 51 is an elongated angle beam 52. The angle beam 52 forms a guiding surface for a plurality of sliding hangers 53 mounted thereon for adjustable longitudinal sliding movement. Three such hangers are provided as shown in FIGURE 2 of the drawing and carried thereby are three limit switches 54, 55 and 56. The limit switches 54—56 are provided with flag-type operators 57 whereby the flag-type operators 57 are adapted to be deflected upon the passage of a round piece thereunder to actuate the limit switches. The limit switches gauge the lengths of the round pieces as they issue from the round straightener and operate the round sorting and unloading table in a manner to be hereinafter more fully explained.

Spanning the outer table portion 32 and the inner table portion 48 and received within recesses therein are a plurality of longitudinally spaced tilting table portions 58 which are provided with depending lug portions 59 adjacent their outer ends that are keyed to an elongated and longitudinally extending shaft 60. The shaft 60 is journaled in suitable mounting brackets 61 attached to the inner faces of the plurality of vertical supports 30 and is adapted to be rotated by a pair of tilting table fluid cylinders 62. The tilting table fluid cylinders 62 are mounted by clevises 63 from the base 26 and have their piston rods connected to links 64 which are in turn keyed to the shaft 60. The arrangement is such that when the tilting table portions 58 are in the position shown in FIGURE 4 of the drawing the inner table portion, the tilting table portions and the outer table portions all cooperate to define a contiguous and gently outwardly and downwardly sloping rolling surface for round pieces having length dimensions falling within predetermined tolerances. However, when the tilting table fluid cylinders 62 are properly energized the shaft 60 is rotated to pivot the tilting table portions downwardly whereby a round piece which is too short or too long will roll from the inner table portion 48 and drop onto the inwardly sloping tilting table portions 58.

Each of the tilting table portions 58 is provided with a downwardly depending angled foot 65 adjacent the inner end thereof which is adapted to rest on the top cover plate 66 of resilient vertically extending support 67 associated therewith when the same is in the tilted position. The vertically-extending supports 67 each comprise a vertical pedestal and a pad 68 of resilient material sandwiched between the top of the pedestal and the top cover plate 66. The feet and the resilient vertically extending supports provide a means for supporting the tilting table portions when in the pivoted position in a resilient manner to absorb the impact forces developed when the round pieces fall from the inner table portion 48 to the tilting table portions 58. It should be apparent that this arrangement, while simplified, is highly advantageous in providing rigid structure and in substantially increasing the useful life of the round sorting and unloading table.

Positioned in nesting relation below the inner table portion 48 and the supporting apparatus therefor is a downwardly inclined table portion 69. The table portion 69 is supported by a plurality of longitudinally spaced vertical supports 70 in much the same manner as the inner and outer table portions and slopes downwardly in a plane generally opposite to the direction of slope of these table portions. Journaled in a plurality of brackets 71 attached to the spaced vertical supports 70 is an elongated and longitudinally extending shaft 72. Keyed to the shaft 72 are a plurality of longitudinally spaced stop arms 73 which are adapted at predetermined times to project through slots 74 adjacent the rear of the table portion 69 above the surface thereof. The shaft 72 is adapted to be rotated by a fluid stop cylinder 75 which is pivotally mounted from the base 26 and has its piston rod connected with a link 76 which is keyed to the shaft 72. The arrangement is such that the shaft can be rotated to position the stop arms 73 to form stop or barrier means whereby any round piece of unacceptable length dimension cannot roll from the table portion 69 into the storage cradles 21. However, when the cylinder 75 is actuated in the reverse direction the stop arms 73 are retracted beneath the surface of the table portion 69 and a round piece of unacceptable length is free to roll into the storage cradles 21.

Considering now the general operation of the round sorting and unloading table, it should be apparent that as a round piece issues from the round straightener 16 the same will move outwardly along the round sorting and unloading table. The round piece will be guided and retained against undue movement by the longitudinal guiding surface 50 due to the rotation of the round piece tending to seat and force the same against the guiding surface. Eventually the round piece will be discharged from the round straightener and will move under the momentum imparted thereby until the entire length of the round piece is received on the inner table portion 48 of the sorting and unloading table. A positive stop 76 (see FIGURES 2 and 3 of the drawing) is provided adjacent the outer end of the inner table portion 48 which is adapted to be engaged by the leading end of the round piece in case the same is still traveling longitudinally by the time it reaches this point. During the longitudinal movement of the round piece the limit switches 54–56 are operative to gauge the length of the round piece to determine whether or not the same falls within predetermined tolerances as will be hereinafter more fully described. If the round piece is within the preset tolerances the round piece can roll down the gently sloping contiguous surface defined by the inner table portion 48, the raised tilting table portions 58 and the outer table portion 32 and fall into the storage cradles 22. However, if the round piece falls without the preset tolerances the fluid cylinders 62 are actuated to pivot the tilting table portions downwardly whereby the feet 65 rest on the resilient vertically extending supports 67. Such a round piece will then roll down the inner table portion 48, drop down onto the tilting table portions 58, roll down the tilting table portions 58 and the table portion 69 and then roll into the plurality of storage cradles 21. In this manner the apparatus of the present invention is adapted to sort or classify the round pieces according to their length dimensions in a fast and efficient manner without interfering with the normal operation of the drawbench or the other ancillary equipment associated therewith.

As previously intimated, the limit switches 54–56 are provided for gauging the round pieces as the same are issued from the round straightener. The limit switches are preferably positioned along the guiding angle in the general relationship shown in FIGURE 2 of the drawing—i.e. the limit switches 54 and 55 being positioned adjacent each other near the entry end of the round sorting and unloading table and the limit switch 56 being positioned adjacent the outer end of the round sorting and unloading table. In general, the distances between the limit switches 54 and 56 and 55 and 56 determine the acceptable length dimensions of round pieces and consequently the distance between the limit switches 54 and 55 represents the tolerance allowed in the acceptable round pieces.

When a round piece first moves onto the round sorting and unloading table it will deflect the flag-type operators 57 associated with the limit switches 54 and 55 to shift the relay contacts 54a and 55a, respectively, and the electric control circuit is such that nothing will happen at this time. As the round piece continues to move along the sorting and unloading table it will eventually engage and deflect the flag-type operator 57 associated with the limit switch 56 to close relay contact 56a. If the round piece is of acceptable length the flag-type operators 57 of the limit switches 55 and 56 will be deflected at this time and nothing will happen whereby, when the stop arms 37 are retracted, the acceptable round piece is free to roll down the contiguous and gently sloping table portions into the storage cradles 22. However, if the round piece is of unacceptable length, only the flag-type operator of the limit switch 56 or the flag-type operator of all of the limit switches 54–56—depending on whether the round piece is too short or too long, respectively—will be deflected. Either of these conditions completes an electrical circuit through closed relay contacts 56a and 55b or 54b to energize a control relay 106 whose contact 106a and 106b close to actuate a control solenoid 101 to actuate the fluid cylinder 62 whereby the tilting table portions 58 are pivoted to their tilted position and the round pieces of unacceptable length are directed to the storage cradles 21 when the stop arms 73 are retracted. A limit switch 77 is positioned beneath the deflecting table portion 69 (see FIGURE 4) which is adapted to be actuated by the passage of an unacceptable round piece thereover to open relay contacts 77a to open the holding circuit comprising contacts 106c of the control relay 106 to return the tilting table portions to their original position. Of course, the electrical control circuit can be arranged to direct the acceptable round pieces to the storage cradles 21 and the unacceptable round pieces to the storage cradles 22 if such an arrangement is desired. It will be noted that the positions of the various limit switches 54–56 are adjustable along the entire length of the round sorting and unloading table whereby any length of round piece within any preset tolerances can be directed to one side of the sorting and unloading table.

Considering now the construction of the shape sorting and unloading table 23, reference should be had to FIGURES 5–8 of the drawing wherein there is shown a preferred illustrated embodiment thereof constructed in accordance with the teaching of the present invention. The shape sorting and unloading table is positioned in front of the shape straightener 17 and comprises a plurality of vertical supports 79 which form a supporting base for an elongated upwardly opening and longitudinally extending generally U-shaped housing 80. The housing 80 is fabricated from metal sheets and plates and reinforced as shown in the various views of the drawing. Received internally of the housing 80 and spanning the sidewalls thereof are a plurality of pairs of longitudinally spaced angles 81 that serve as supporting surfaces for a plurality of bearing assemblies 82. The bearing assemblies are alternately offset transversely and journal a pair of elongated and longitudinally extending rock shafts 83 and 84. The rock shaft 83 has a plurality of longtiudinally spaced kicker arms 85 keyed thereto while the rock shaft 84 carries a plurality of similar longitudinally spaced kicker arms 86 which are rotatable therewith. It will be noted that the kicker arms 85 and 86 are so disposed along the shafts 83 and 84 that the same define longitudinally spaced pairs of kicker arms with each of the pairs comprising a kicker arm 85 and a kicker arm 86 positioned in closely adjacent relation. The kicker arms 85 of the shaft 83 are oppositely mounted with respect to the kicker arms 86 on the shaft 84 whereby the same nest with respect to each other and extend in opposite directions across the opening defined by the U-shaped housing 80. It will be noted that when the kicker arms are in one position they are received entirely within the housing 80 but when rotated to another position project above the top surface of the housing. This is shown in FIGURE 7 of the drawing.

For rotating the rock shafts 83 and 84 there are provided a pair of kicker fluid cylinders 87 and 88, respectively, which are each pivotally mounted by a clevis 89 and have their piston rods connected to links 90 which are in turn keyed to their respective shafts 83 and 84. Each of the links 90 is provided with a depending actuating lug 91 on the bottom surface thereof which is adapted to trip a recycling limit switch 92 or 102 mounted on the outward end of the housing 80. Thus, as will be more readily apparent, the cylinder 87 or the cylinder 88 may be actuated to pivot the kicker arms 85 or 86, respectively, to direct a shaped piece into the plurality of storage cradles 24 or 25.

Fitted over the top opening of the U-shaped housing 80 and positioned between the spaced pairs of the kicker arms 85 and 86 are a plurality of elongated channel shaped cover plates 93 which define a continuous table-like supporting surface for the shaped pieces throughout the length of the shape sorting and unloading table. The spacing between the cover plates provide slots through which the kicker arms are adapted to project to deflect the shaped pieces to either side of the shape sorting and unloading table. The opposite sides of the table-like supporting surface are provided with outwardly flaring downwardly inclined guide plates which extend to the storage cradles 24 and 25 whereby a shaped piece is guided into either of the rows of storage cradles positioned on the opposite sides of the shape sorting and unloading table.

Attached to both the front and rear ends of the housing 80 are U-shaped vertically extending structural brackets 94 which serve as supports for a longitudinally extending beam 95. The beam 95 is properly shaped to resist any bending thereof under its own weight and the bottom surface thereof serves as a guide for adjustably and slidably mounting three slides which carry limit switches 96–98. These limit switches are provided with flag-type operators 99 and are adapted to gauge the length of the shaped pieces to actuate the kicker cylinders 87 and 88 in a manner similar to the actuation of the limit switches 54–56 associated with the round sorting and unloading table.

Thus, if a shaped piece is within the preset tolerances the limit switches 97 and 98 will be actuated to shift the relay contacts 97a and 98a to complete a circuit through contacts 96a, 97a, and 98a to energize control relay 103 which in turn, through its contacts 103a and 103b, actuates control solenoid 104 to actuate kicker cylinder 87 to move the workpiece into the storage cradles 25. A holding circuit is also completed through relay contacts 103c, 92a and 102a for the relay 103 which is opened when the lug 91 actuates the limit switch 102. If the workpiece is of an unacceptable length—either all three of the limit switches actuated or only the limit switch 98 actuated—a control relay 105 is actuated through a circuit comprising the closed relay contacts 98a and 97b or 96b whereby control solenoid 106 is actuated upon closure of contacts 105a and 105b. This energizes kicker cylinder 84 to rotate rockshaft 86 thereby causing the kicker arms to sweep the shaped workpiece into the storage cradles 24.

The limit switch 92 is tripped by the lug 91 after predetermined movement of the rockshaft to shift contacts 92a whereby a holding circuit comprising relay contacts 105c for the relay 105 is opened to return the kicker arms to their original positions.

It should be noted that the shape sorting and unloading table does not embody means for limiting or restraining the shaped pieces as they move along the table-like supporting surface. Such means are not needed in the case of shaped pieces since the same issue from the shape straightener in an even and straight manner. If the momentum of the shaped pieces has not been absorbed by the time the same reaches the outer end of the shape sorting and unloading table a spring biased stop 100 mounted at the far end of the table-like supporting surface is engaged. Of course, the limit switches 96–98 are adapted to be positioned at any point along the beam 95 whereby any desired length of shaped piece can be ejected into the storage cradles 25. In addition, the electrical circuit can be arranged to direct the shaped pieces of acceptable length to the storage cradles 24 and those of unacceptable length to the storage cradles 25 if this is desirable.

It should thus be apparent that I have accomplished the objects initially set forth by providing improved and highly simplified sorting and unloading apparatus for draw-benches and the like. In addition, it will be noted that the round and shape sorting and unloading tables embody many improved and highly advantageous constructional features such as the means employed for journaling the very long rock shafts at spaced points throughout their lengths. Also, the sorting and unloading apparatus of the present invention is adapted for use with mechanisms other than drawbenches as will be apparent to those skilled in the art.

Many changes may be made in the illustrated embodiments of the invention without departing from the clear teachings thereof. Accordingly, reference should be had to the following appended claim in determining the true scope and intent of the invention.

I claim:

Apparatus for receiving elongated metal rounds advancing longitudinally from a straightener or the like and for classifying said round as to length comprising in combination a longitudinally extending table sloping downwardly to one side of the longitudinal path of travel of the rounds onto said table, said table having a stop to limit the forward progression of the rounds on the table, said table having a retractable portion intermediate its side edges operative when retracted to divert a round rolling sideways down said table from the surface thereof, a longitudinally extending and vertically disposed side guide extending upwardly of the high edge of said table and being on the opposite side of said path of travel from said retractable portion of the table, a plurality of flag switches supported with respect to said table and positioned in longitudinally spaced relation along said path for actuation by the advancing rounds and thus to indicate the length of the rounds as the later approach said stop, and means operated by said flag switches to retract said retractable portion of said table.

References Cited in the file of this patent

UNITED STATES PATENTS

| | | |
|---|---|---|
| 2,636,601 | Bovay | Apr. 28, 1953 |
| 2,781,905 | Phillips | Feb. 19, 1957 |
| 2,938,552 | Rogers | May 31, 1960 |